Y2587 OR 3,919,528

United S

Cooper et al.

[11] 3,919,528

[45] Nov. 11, 1975

[54] METHOD AND APPARATUS FOR OPERATING AUTHORIZATION CONTROL SYSTEMS

[75] Inventors: Irving B. Cooper, Marblehead, Mass.; Joseph V. Gurrieri, Rocky Hill, Conn.; Michael J. Lord, Lincoln, Nebr.

[73] Assignee: Notifier Company, Lincoln, Nebr.

[22] Filed: Aug. 9, 1974

[21] Appl. No.: 496,260

Related U.S. Application Data

[63] Continuation of Ser. No. 268,197, June 30, 1972, abandoned.

[52] U.S. Cl. .................. 235/61.11 A; 235/61.7 B; 235/61.11 H; 336/83; 194/4; 340/149 A

[51] Int. Cl.² G06K 7/08; G06K 19/06; G07F 1/06; H01F 15/02

[58] Field of Search . 235/61.11 A, 61.7 B, 61.11 E, 235/61.11 R, 61.11 D, 61.11 H; 340/149 A; 200/46; 336/83; 194/4

[56] References Cited

UNITED STATES PATENTS

| | | | |
|---|---|---|---|
| 3,035,764 | 5/1962 | Beman | 235/61.9 R |
| 3,443,675 | 5/1969 | Yamamoto | 194/4 |
| 3,474,230 | 10/1969 | McMillen | 235/61.7 R |
| 3,564,214 | 2/1971 | Cooper | 235/61.11 H |
| 3,598,968 | 8/1971 | Victor | 235/61.11 H |
| 3,627,993 | 12/1971 | Cooper | 235/61.11 H |
| 3,665,162 | 5/1972 | Yamamoto | 235/61.7 B |
| 3,737,629 | 6/1973 | See | 235/61.11 E |
| 3,740,530 | 6/1973 | Hoffer | 235/61.7 B |

*Primary Examiner*—Daryl W. Cook
*Assistant Examiner*—Robert M. Kilgore
*Attorney, Agent, or Firm*—Lowe, Kokjer, Kircher

[57] ABSTRACT

A method and apparatus for serially reading nonferrous hidden coded indicia on opaque cards has a single row (or staggered row) of sensors. These sensors and related circuitry detect the presence or absence of thin copper discs (bits) arranged in rows and columns and encased within the opaque card material. The rows of coded indicia are movable at right angles to the sensor row(s) thereby allowing the sensors to detect the bit presence in each row and to serially transmit data (corresponding to the bit presence) via a single line transmission technique to a data processing console.

The data may take the form of BCD information and a determination is made at the data processing console (or in the reader unit itself) as to the correctness of same for the purposes of access, dispensing or the like. A decoding section, including a multiple correct code matrix and a combination correct digit counter and a total digit counter check either (or both) the card data or push button data for correctness.

The method includes steps of
- causing relative motion between a row of sensors and a card having hidden coded indicia thereon in the form of nonferrous bits arranged in a plurality of rows and encased therein,
- serially detecting the presence or absence of said bits in said rows,
- producing an electrical output having serial data therein that corresponds to said presence (or absence) of said bits in said card rows, and
- determining the correctness of said code represented by said electrical output.

13 Claims, 16 Drawing Figures

METHOD AND APPARATUS FOR OPERATING AUTHORIZATION CONTROL SYSTEMS

This is a continuation of application Ser. No. 268,197, filed June 30, 1972, now abandoned.

Background and Brief Description of the Invention

The concept of sensing non-ferrous bits by the "shorted turn" method has been described in the Cooper U.S. Pat. Nos. 3,508,031; 3,619,728 and 3,627,993. Such systems have a particular utility in conjunction with certain commercial and government activities requiring various levels of security ranging from the mere identity of individuals to the relatively high degree of security required in certain installations for military and government agencies. Many other systems are now utilizing cards with raised or hidden indicia thereon as a control element. Petroleum vending stations, accounting systems, and door or area access controls have and are presently utilizing systems which require cards or other control elements to effect the operating element through a control system sensing device. As mentioned in the above mentioned Cooper patents, these sensing devices should function reliably, require little or no maintenance, and provide a reasonably high degree of security against unauthorized use.

The sensing of non-ferrous metal bits inside of an opaque card has been conveniently referred to as the "shorted turn" detection method and sensing system. In such a system, the non-ferrous metal bit is generally a copper or aluminum (or any other selectively sized electrical conductive material) disc which when inserted between the primary and secondary coils of a sensing transformer absorbs energy and prevents an energy transfer to the secondary coil. So long as the non-ferrous material has an electrical conductivity in the area where the energy field is present, such a system is operative. However, the thicker the bit material, the increased conductivity and a better ratio of bit to no bit is obtained. Such a ratio is an effective measure of how well the device is working. The utilization of improved windings and cores have permitted the size of the (generally) copper bits to become smaller and to thereby enable cards with as many as 70 or more bits to be manufactured. Accordingly, Social Security numbers and other vital information statistics concerning the card bearer can now be coded therein without fear of duplication or alteration.

The subject card readers are capable of serially reading cards having copper bits encased therein with bit sizes as small as 3/32 of an inch in diameter and a 1.4 mils in thickness. Also, etched material on Mylar backings may be utilized to good advantage. Since copper or other non-ferrous bits located inside the opaque cards cannot be detected by magnetic means or by dropping iron filings or other ferric material on the surface of the card and observing the pattern formation thereon, the resultant security is automatically enhanced. Additionally, a very thin lead sheath may be placed over the surface of the copper bits to preclude x-raying as a means for determining the code condition therein.

The most frequently used techniques in reading cards with the non-ferrous bits encased therewithin generally require that all information on the card is read simultaneously in all coded positions. This has generally been referred to as "parallel card reading" and enabled the card information to be instantaneously presented to the circuit outputs or decoding circuitry. Furthermore, the reading was done as soon as a position switch was actuated which indicated proper location for the card reading. Card movement presented no problem with the parallel reader technique as the reading could be accomplished in a matter of microseconds and the card could be inserted and extracted as rapidly as humanly possible so long as the position switch was actuated. Furthermore, the card could be captured by the reader and held therein if it proved to be invalid.

The card capturing technique for invalid codes can be particularly desirable. For instance, the many uses of such a card could include ski lift operation where a card would serve as a ticket to a ski tow or chair lift during the entire day but would be capturable by the card reader and retained therein at the end of the day. Such a procedure would require that the reader perform the reading as the card is inserted into the device or as it is simultaneously stored as in the parallel reading scheme mentioned, supra. Additionally, petroleum dispensing systems can take particular advantage of a parallel reading concept as the card would be left in the reader for the duration of the fuel dispensing operation and removed when it is desirable to turn off the pump or fuel dispensing mechanism.

A serial reader, for subject cards, that reads the card as it is inserted (or withdrawn) into the reader device has many of the advantages of the parallel reader even though the serial reader does require that circuitry be provided for counting and timing in order to accommodate the various speeds at which an individual may either insert or withdraw the card. One of the principal differences in a serial reader approach over parallel reading is that fewer primary and secondary reading coils are needed. As will be seen, only a single row (or row array) of sensing coils is needed as the data on the card will be read as the card is manually pushed by the row. This is to be contrasted to the parallel reading approach where a pair of reading coils were needed for each possible data bit position on the card. Further, since the card may be read as it is inserted into the reader device, it may be captured just as in the parallel reading approach.

One primary embodiment of the invention includes the utilization of a single row (or array) of sensing devices with spaced apart primary and secondary coils. A pulse will be applied to the primary coils to induce a voltage in its corresponding secondary coil unless a bit of non-ferrous electrically conducting material is present between the two coils to attenuate the induced voltage. Accordingly, the presence of a bit (usually either copper or aluminum) between the coils will produce a binary 0 while the absence of a bit will produce a binary 1 on the output line of the secondary core. (Alternately, a circuit could be used which produced a 0 indicative of the presence of a bit and a 1 to indicate the absence of a bit.)

The serial reader will include circuitry for driving or strobing the primary coils at the proper time. A clock bit may be used for strobing the coils at the proper time. For example, a driver circuit will be provided to pulse the primary sensing coils in accordance with clocking information taken from the card itself. Since a pulse output on the secondary winding coils indicates the absence of a copper bit between the primary and secondary coil, a monostable multivibrator circuit may be interconnected with suitable circuitry and triggered for a preselected time by the occurrence of a pulse in the secondary coil output. Therefore, the presence of a bit between the two windings, which correspondingly deletes the pulse from the secondary winding output, will not trigger the interconnected monostable and a 0 condition is immediately detected. The data, in this form, can be instantaneously transmitted to a console as it is read from the card and no storage is necessary in the card reader. Further, the data may be arranged to be dumped serially out onto a transmission line or single line transmission. However, since the coded indicia is usually in rows, the data is serially read from the card, delivered to a shift register, dumped from the shift register and onto the transmission line in proper serial form.

The above mentioned data, if not transmitted to the console may be delivered to a decoding and comparison circuit on the unit itself. The decoding circuitry takes binary coded decimal numbers (BCD) and checks same for correctness. The input to this circuit is a 4 bit binary coded number but may take on various binary coded forms. A decoding matrix originally determines the correctness of the numbers in the coded input and transmits same to a comparison and delay circuit that further insures that only the pro number (or numbers) will be treated as being correct. The decoding matrix permits a plurality of codes to be entered and decoded as correct. This may be considered closely analogous to a master keying technique used in conventional hardware locks.

It is contemplated that a push button keyboard may be used in combination with the decoding and comparison circuitry and that the source of BCD information may alternately be derived from the keyboard. Additionally, the combination of a card reader plus push button keyboard may be utilized to permit access or assist in the vending processes.

One of the primary objects of the invention is to provide a uniquely constructed serial card reader which will operate to effectively read and sense hidden nonferrous metal bits encased within a card or document.

Another object of the invention is to provide a unique method and apparatus for serially reading metal or non-ferrous bits encased within cards or documents by the "shorted turn" process.

A further object of the invention is to provide in a method and apparatus of the character described above, a means for improving the sensitivity of sensing devices utilized with the shorted turn process. It is a feature of this invention that the bit to no bit ratio and the ability to sense same is substantially enhanced by the utilization of shell or pot cores with each coil winding. This structure, in combination, with carefully selecting the turns ratio on the primary and secondary of the sensing coils have enabled smaller and more bits to be utilized in a conventional sized credit and/or identification card.

A still further object of the invention is to provide a uniquely constructed serial card reader that reads the coded indicia on the card as the card is inserted in (or withdrawn from) the reader apparatus. It is an important feature of this object that suitable means can be provided to capture or to otherwise retain the card within the reader apparatus under certain preselected conditions.

Another object of the invention is to provide a uniquely constructed serial card reader having novel timing and comparing circuitry associated therewith to compensate for various speeds at which individuals may either insert or withdraw a card from the subject reader.

A further object of the invention is to provide in a card reader of the character described immediately above, circuitry which eliminates a clock bit row for the purpose of strobing the sensor coils. It is a feature of the invention that the associated clock pulses may be derived from the presence of a data bit in each coded data bit columns and that this data bit presence is utilized to perform register stepping techniques at the proper time.

A further object of the invention is to provide a uniquely constructed card reader that has eliminated the need for storage registers in the card reader structure. It is a feature of the invention that data can be instantaneously transmitted to an auxilliary decoding console. Accordingly, the circuitry needed on the card reader itself can be substantially simplified over prior art parallel readers and modifications to the circuitry easily made so that all of or any selected portion of corresponding cards may be read without any increase in circuitry.

A further object of the invention is to provide a unique constructed card reader that is rugged, long lasting, and which may be substantially reduced in size due to the elimination of sensing coils and associated storage registers that have heretofore been required. The subject card reader is therefore capable of being attractively housed in a small box, panel mounted flush against the wall or pedestal mounted at point of sale or guard stations, as the need may be. Further, with the elimination of certain types of circuitry and components therein, the power consumption in the readers can be substantially decreased, smaller power supplies utilized and the overall cost and size of the unit decreased.

A still further object of the invention is to provide uniquely constructed card reader that will minimize the wear on the cards or documents normally utilized therewith.

Another important object of the invention is to provide unique decoding and comparison circuitry that is utilizable with serial card readers or the outputs from conventional push button keyboards.

Another important object of the invention is to provide a unique security system which includes the combination of correct keyboard entry and card reader validation to approve the identity of the user of said system.

A still further object is to provide a uniquely constructed decoding matrix that is utilizable with either card readers or push button keyboard digital locks. The subject decoding matrix will permit a plurality of number sequences or code indicia on cards to be verified depending on the binary coded number input thereto.

Another object of the invention is to provide a comparison circuit for utilization with card readers, keyboard entries or other types of binary coded numbers wherein it is necessary to validate and indicate the correctness of certain preselected numbers. It is a feature of the invention that the comparison includes a total digit and a correct digit counter and appropriate interconnecting circuitry to indicate the correctness of the coded card and/or number code that has been entered on the keyboard.

A further object of the invention is to provide a serial card reader which electrically reads coded indicia on the card as the card is inserted through a slot and deposited into a receptacle behind the slot that is not accessible to the bearer of the card. In this manner, the visitors at commercial plants, military installations and the like may be given coded badges or cards, the cards inserted through the slot and an automatic record maintained of the comings and goings through a particular access door or area.

These and other objects of the invention, together with the features of novelty appurtenant thereto, will appear in the course of the following description.

Detailed Description of the Invention

In the accompanying drawings, which form a part of the specification and are to be read in conjunction therewith and in which like reference numerals are employed to indicate like parts in the various views.

Figure 9A:
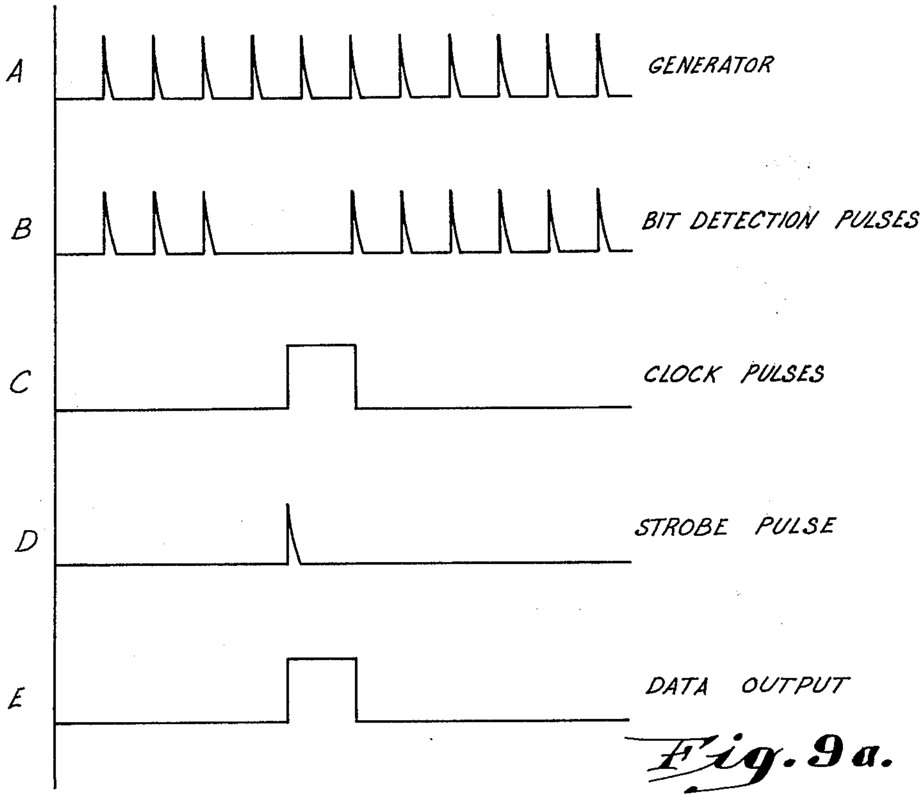
FIG. 9 is a schematic diagram of timing circuitry used with the serial card reader.
Figure 12:
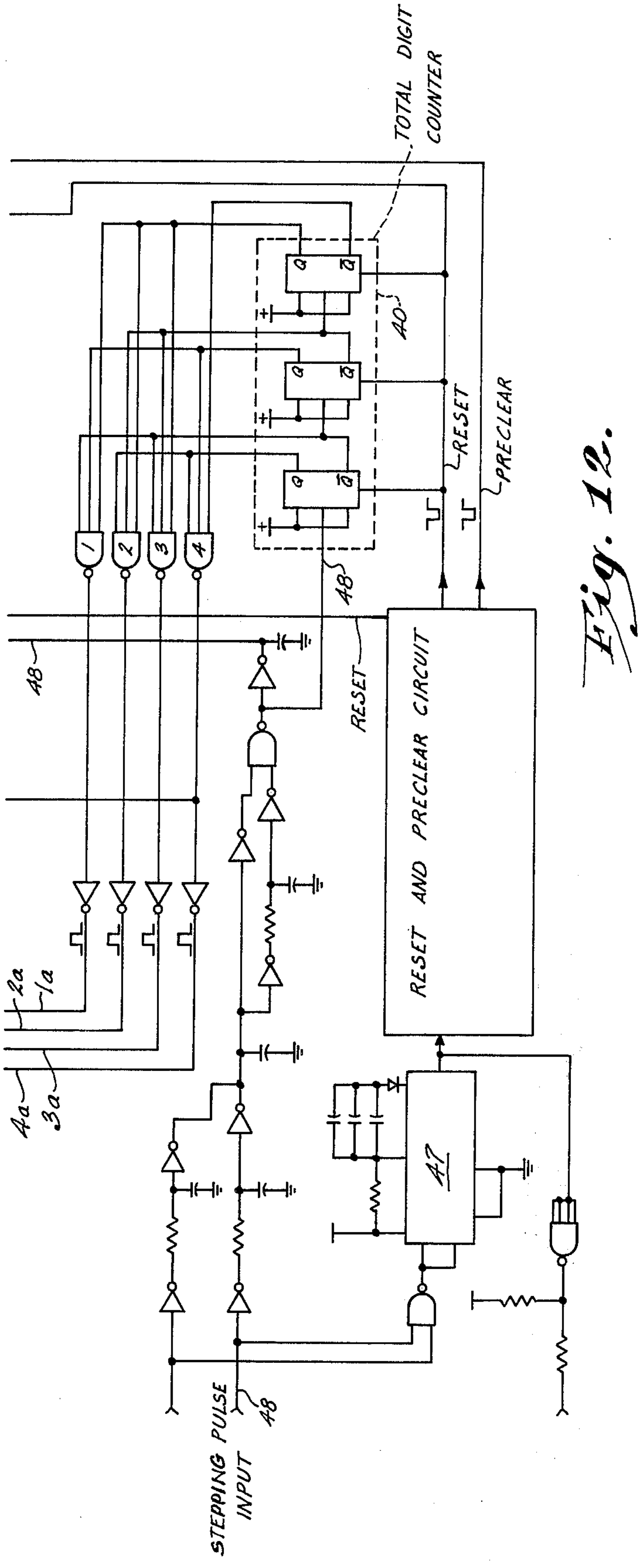
Figure 10:
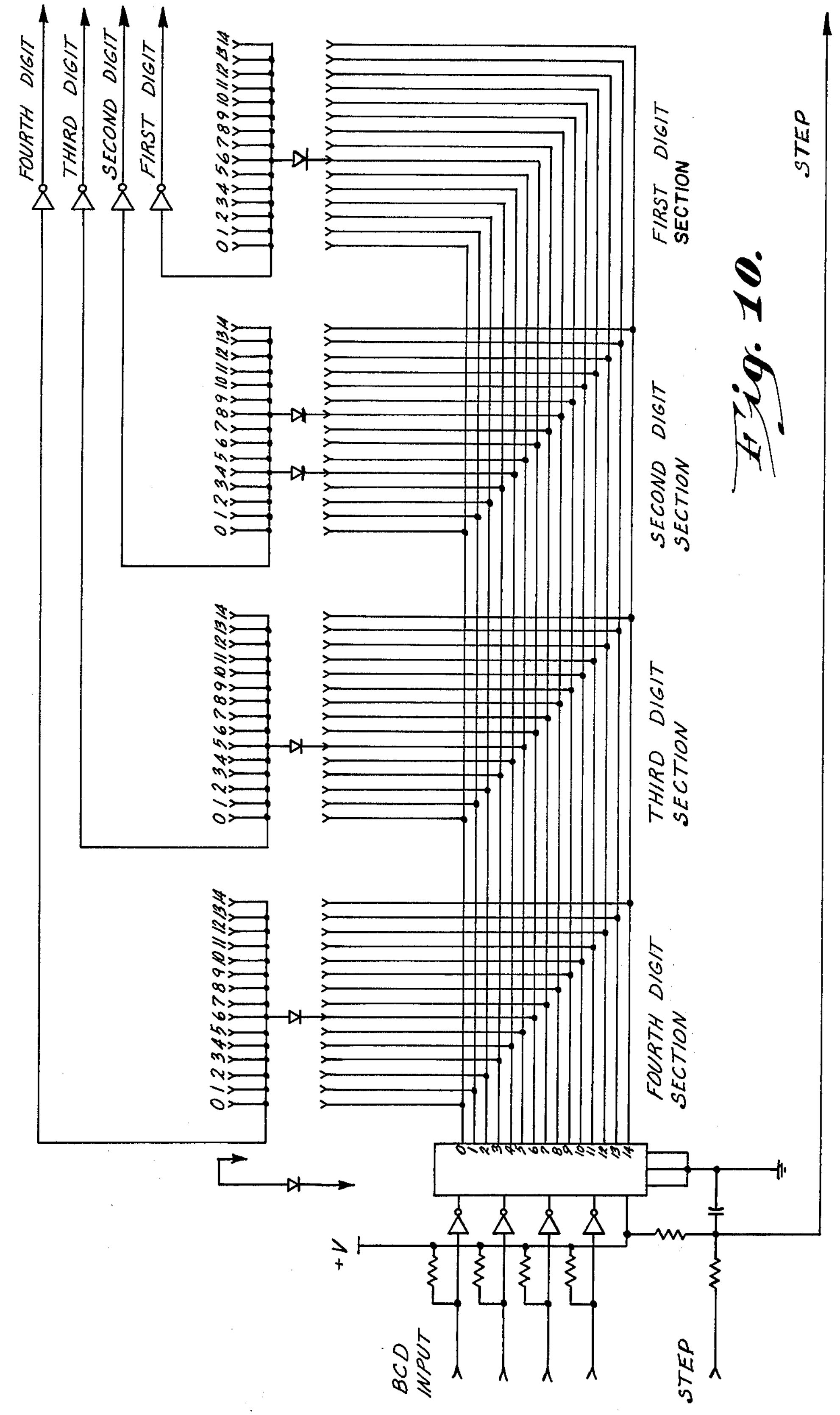
Figures 11, 14:
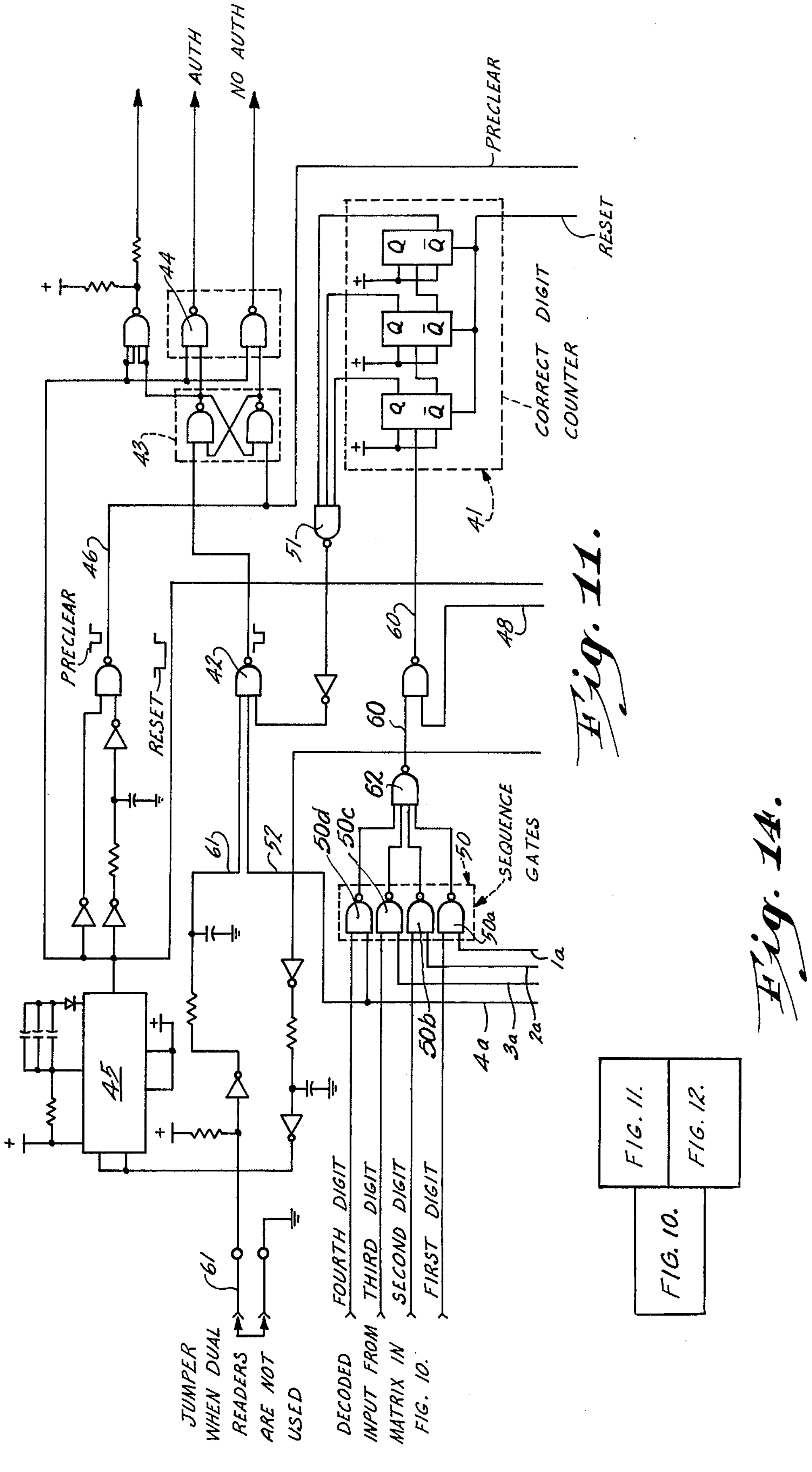
Figure 13A:
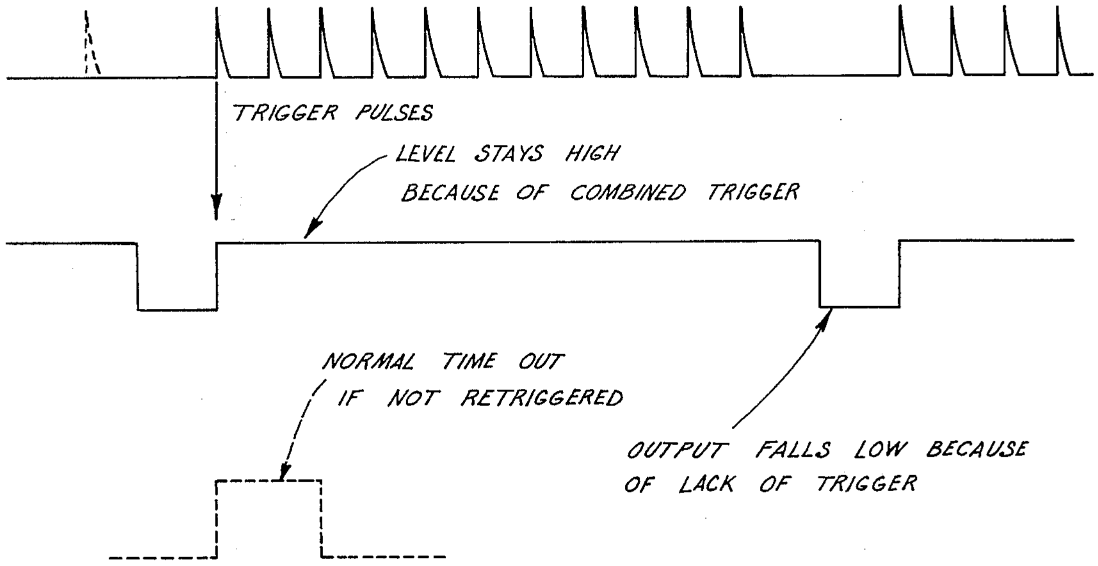
Figure 13:
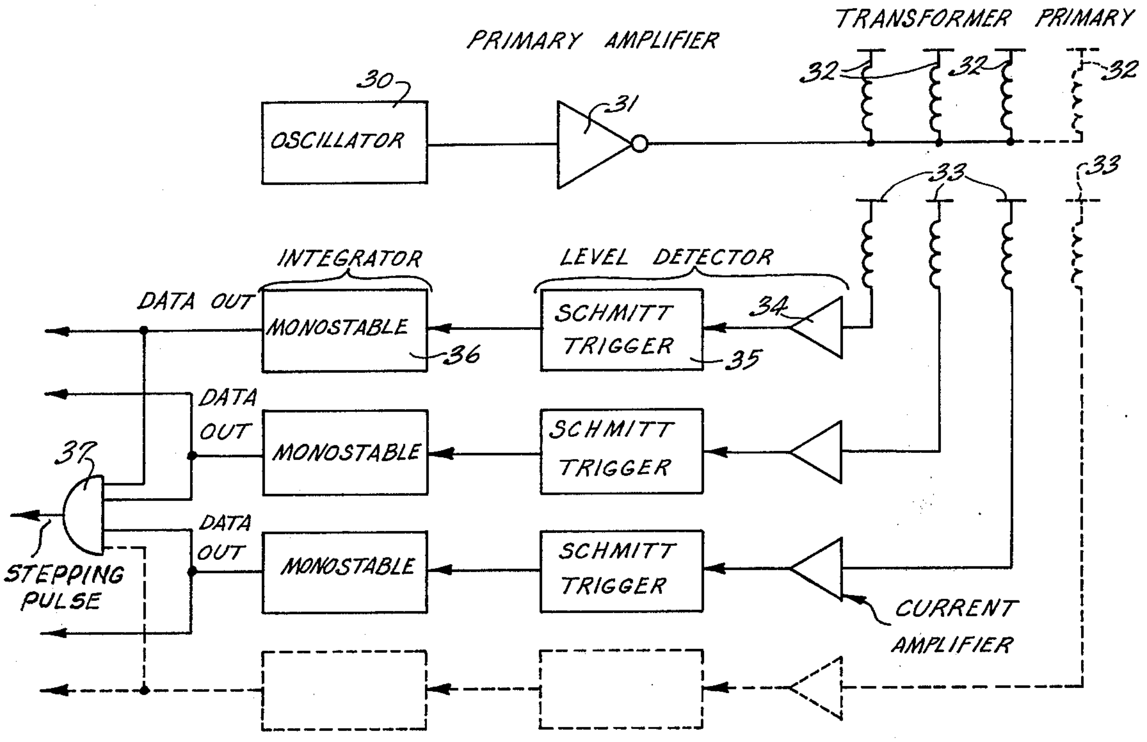

FIG. 9*a* is a timing diagram correlating the generated pulses and the data output;

FIG. 10 is a schematic diagram of the decoding matrix used with either (or both) the serial card reader or the push button reader;

FIG. 11 is a schematic diagram of the upper portion of the control and comparison circuitry that interconnects with the decoding matrix shown in FIG. 10;

FIG. 12 is the lower portion of the control and comparison circuitry shown in FIG. 11;

FIG. 13 is a block diagram of certain portions of the data bit detecting circuitry;

FIG. 13*a* is a timing diagram showing the relationship between the trigger pulses and the monostable output; and FIG. 14 is a plot showing how FIGS. 10, 11 and 12 should be arranged for proper viewing.

Figures 1, 2, 3, 4, 5, 6, 7:
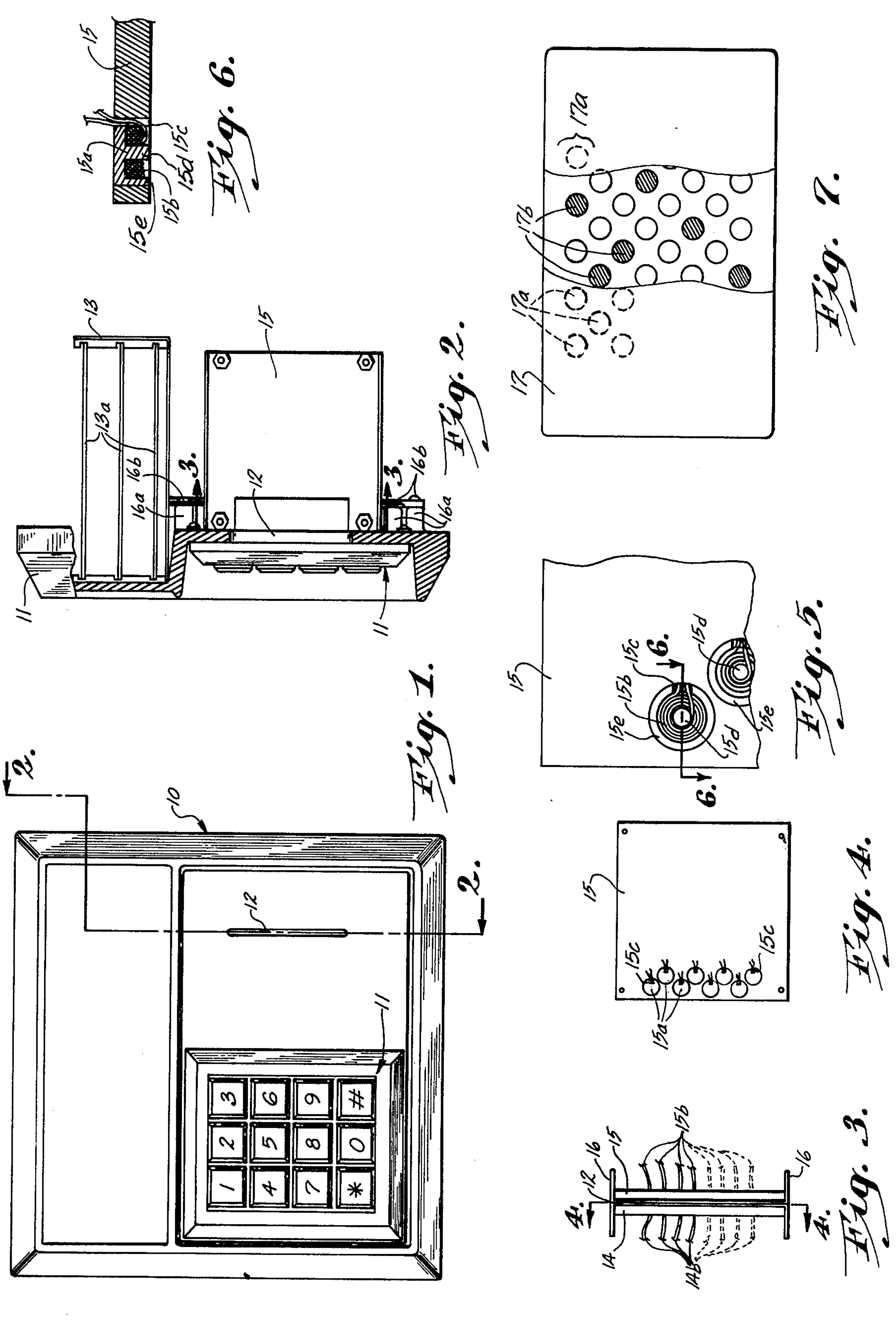
FIG. 1 is a front elevational view of a device which includes a push button keyboard and a serial reader card slot.
FIG. 2 is a sectional view taken generally along the line 2—2 of FIG. 1 in the direction of the arrows and showing the keyboard push button and card slot from the side, with the mounting means for printed circuit boards and sensor coil board being shown in elevation.
FIG. 3 is an end view taken generally along the line 3—3 of FIG. 2 in the direction of the arrows and showing the spaced apart core block assemblies wired for 4 column detection.
FIG. 4 is a side elevational view of one of the core block structures showing the sensor coils arranged in a single array located on the left hand portion of the core block.
FIG. 5 is an enlarged view of one of the sensing element secondaries including the cup core and coil structure embedded in the core board and showing the opposite side shown in FIG. 4.
FIG. 6 is a sectional view taken generally along the line 6—6 of FIG. 5 in the direction of the arrows.
FIG. 7 is a top elevational view of a typical card configuration with portions of the card configuration broken away to show the possible arrangements of copper bits (indicated by the shaded circles) in the rows and columns of data areas and with the broken lines indicating the potential data areas that are covered by the opaque card material.

Turning now more particularly to the drawings, FIG. 1 depicts the combination push button lock and card reader. It should be understood that the various embodiments disclosed hereinafter are capable of independent operation as either a push button lock, a card reader or as the illustrated combination of the two. The device illustrated in FIGS. 1 and 2 is of the type that may be wall-mounted and will include a cover or frame 10 that will abut against a wall or panel in and around an appropriately recessed area. It is contemplated that the frame 10 may be screwed, bolted or otherwise semi-permanently affixed against the wall and is relatively tamper proof particularly when under the surveillance of attendant personnel.

Reference numeral 11 represents a 12 button keyboard which will permit the entering of numbers 1–10 in an adjacent logic and digit decoder or in a remote decoding console. In any event, the keyboard 11 is a conventional unit which will, for the purposes of this discussion, have a four wire output from each key so that the binary designation of each number of from 1–10 can be produced and transmitted in binary form.

Reference numeral 12 depicts a card slot of an appropriate size to accommodate a credit card sized document therein.

As shown in FIG. 2, a printed circuit board rack 13 is conveniently located above the keyboard and slot area to the rear of frame 10 and provides a holding means for a plurality of printed circuit boards generally represented by the numeral 13a. These boards (13a) may correspond to a logic and 4 digit decoder section (which will be described in more detail later) if it is desired that same be located closely adjacent to the unit as opposed to a more remote location. A pair of spaced apart coil blocks 14 and 15 are located with their forward edges in a substantially vertical plane on either side of slot 12 (and in communication relationship therewith) thereby forming a card sensing area therebetween. The two core boards (14 and 15) are supported by brackets 16 and are attached to the rearwardly extending bosses 16*a* by the screws 16*b*.

The construction of the core boards is shown in more detail in FIGS. 4–6 and will be substantially similar except that one board will contain the primary coils while the opposite board will contain the secondary coils. It should be understood that either board may contain either coils; however, board 14 is used to diagrammatically show the board having the primary coils therein while board 15 contains the secondary sensing coils. As shown in FIG. 4, an array of 8, coil and core combinations are arranged along the left hand vertical edge of same. In actual construction, 8 holes will be drilled along the edge portion of each board and ferrite pot cores (on the secondary core board 15) generally represented by the numeral 15*a* (FIG. 6) with windings or coils 15*b* wound thereon and placed in each of the prescribed holes. A notch 15*c* in the core will permit the winding leads or coil leads to be played out therefrom and interconnected with appropriate circuitry. The pot core and coil combinations are then glued in place and require little or no maintenance for the life time of the device. Each core is generally cup-shaped and includes a center post 15*d* which is circumscribed by the side walls 15*e* (see FIGS. 5 and 6).

It has been found that if approximately 25 turns are placed on the primary cores, and 160 turns on the secondary, that the sensitivity of the device is improved since the combination of the pot cores and windings tend to concentrate the flux field and permit smaller and thinner bits to be easily detected. Accordingly, the bit to no bit ratio is substantially enhanced. (For purposes of the further discussion, the cores on the primary board are identified by the numeral 14*b*.) For purposes of this discussion, a single row of sensors will be used and the description will be relative to the sensing of data bits of only four columns (therefore having 4 bit positions per row) of the hidden coded non-ferrous metal bit positions.

A coded card 17 is shown in FIG. 17 as being similar to the type described in the above mentioned Cooper patents. However, this card is shown as containing 9 rows with 8 data positions in each row. This card will be of selected size so that the top column (17*c*) of the data positions will move in a horizontal plane between the uppermost sensor device, that being between the uppermost coils 14*b* and 15*b* and their respective pot cores. Further, there will be a bit position for the remaining 7 sensors on the card even though all or any portion thereof may be actually utilized. In any event, the data positions on card 17 are shown as the circular positions 17a with the shaded position 17*b* indicating the location of thin copper discs having a thickness in the order of 2.5 mils and backed with a lead sheath (not shown). It has been found that a thin copper (aluminum or related material) sheath (not shown), with selectively placed apertures in row and column orientation, may be used in place of the non-ferrous bits described above.

Figure 9:
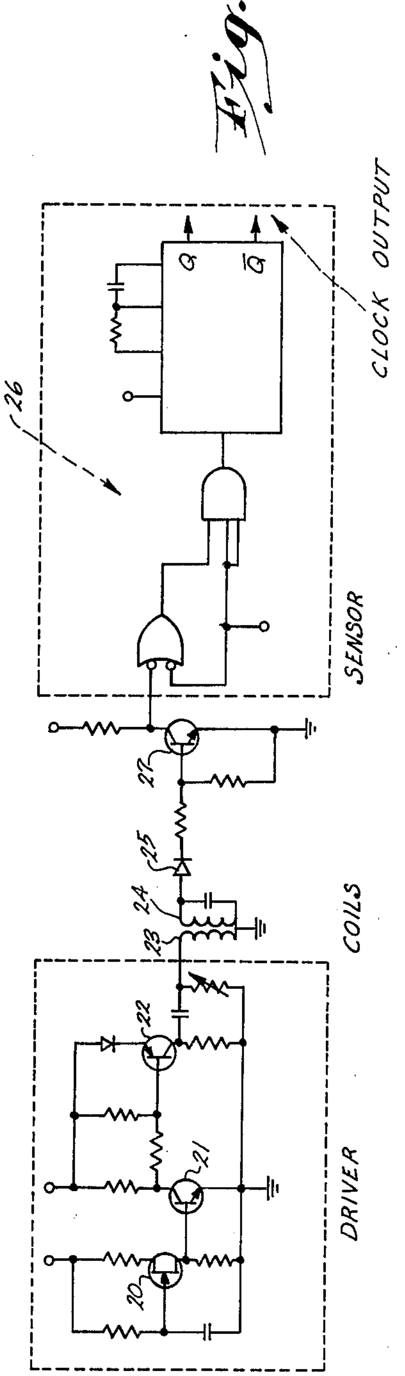

As suggested above, a card may have a clock column thereon which will serve to initiate driver action and strobe the primary windings as the card is either being inserted or withdrawn from the serial card reader. FIG. 9 diagrammatically shows a circuit for sensing the clock column on the card and using the output there to strobe the primary coils of the other bit sensors. The first embodiment of the serial reader portion of the invention utilizes the clock column on the card together with a sensing mechanism at the rear of the card reader. This last mentioned sensing mechanism may take the form of a primary and secondary coil along with sensing circuitry to detect when the last bit of a clock column has entered into position under that particular coil. This indicates that the card is in the reader and in the proper position so that it can be read as it is extracted from the reader. As the card is extracted, the clock column bits cause the information to be strobed in the other 4 positions (assuming only 4 of the coils are being used for sensing purposes) at the appropriate time when they are between the primary and secondary thereof. The clock column does the detecting to determine when the rows are lined up between the sensing mechanisms so that the information thereon can be interrogated.

The operation of the clock circuit is shown in FIG. 9 and is comprised of a unijunction transistor 20 which forms an oscillator circuit having an output that is delivered to transistor amplifier 21 and from thence to another amplifier stage (transistors 22). The output from the collector of transistor 22 is delivered to the primary coil 23. The electric field created by primary 23 is electrically linked with the secondary coil 24. The output of the secondary coil 24 passes through a level shifting diode 25. Transistor 27 amplifies the output from diode 25 and delivers same to a Schmitt trigger shown within the broken lines 26. The Schmitt trigger is an integrated circuit which may also be considered to be a threshold detector monostable multivibrator.

The oscillator portion of the circuit, which includes unijunction 20, provides periodic pulses which are pulsed to determine whether or not a bit is present at that position. The pulses from the oscillator are amplified and shaped by the amplifier sections 21 and 22 and are applied to the single primary in the clock position. The output from the secondary coil 24 determines whether or not a copper bit was between the primary or secondary. If a pulse is present on the output thereof, this is an indication of an absence of the copper bit. The diode shifts the level such that the output of the secondary coil needs to exceed at least 1.2 volts in order to turn on the transistor 27. When transistor 27 turns on it fires the monostable multivibrator 26 which is a retriggerable integrated circuit. (e.g. Every time a pulse comes in, the monostable is triggered and if the output is not allowed to fall or the unit not permitted to time out, the trigger pulse extends the time of the monostable by the amount of the time constant thereof.)

When the pulses from the secondary coil 24 cease to trigger the monostable (because of a clock bit coming into position between the primary and secondary coils) the monostable output falls to zero as it is no longer being triggered by incoming pulses. This indicates the presence of the bit beneath the clock column sensor and that data information is lined up and ready to be interrogated. At this time, the information in the other 4 positions (data positions) is strobed by circuitry using another pulse driver similar to that described above which pulses or strobes the other 4 primary coils to provide outputs to the other 4 data sensing amplifiers.

Figure 8:
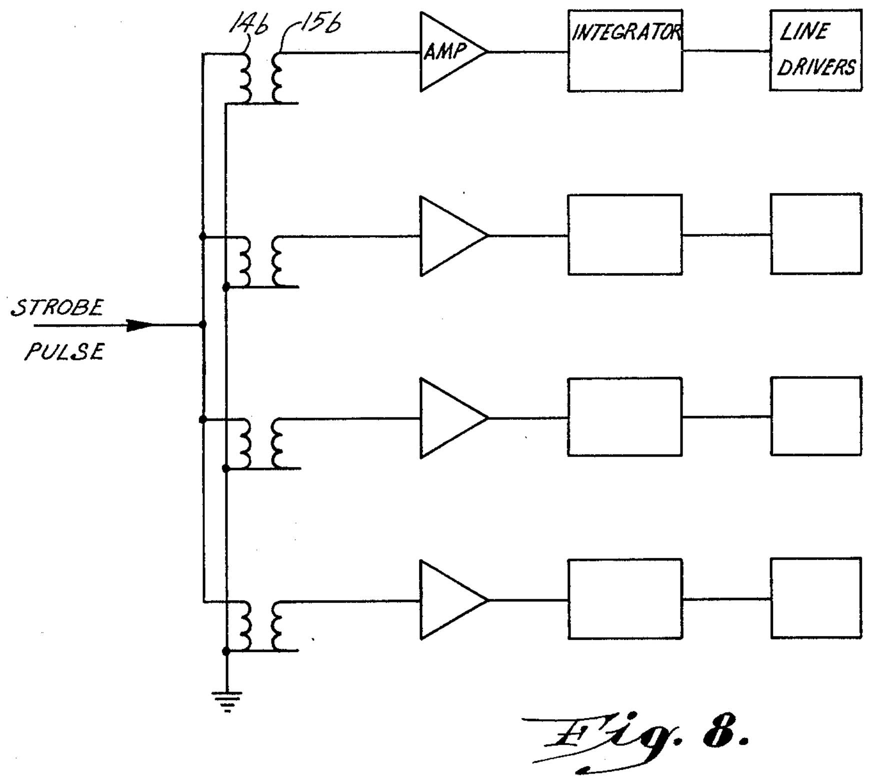
FIG. 8 is a schematic diagram showing the strobing arrangement for the primary sensing coils and with the related secondary circuits being shown in block diagram form.

FIG. 8 discloses the strobe pulse being delivered in parallel to the 4 primaries of the sensing coils 14*b*. The outputs from secondary coils 15*b* go through the amplifier circuitry, a temporary memory (integrator or monostable circuit) and into a line driver. The line drivers transmit information directly back to a processing type of console as the card is extracted from the card reader. When the information is received at the console it is loaded into a register and stored as it is received. When this information has been completely stored and has been checked as to the format it is then loaded into the processing computer where the information is again checked as to validity against a computer memory. Upon completion of the memory check and the computer processing, the results are transmitted back to a control box located in close proximity to the card reader. This control box will perform the function of activating the door strike mechanism or turning on a petroleum dispensing mechanism or whatever the associated attachment may be. Note the timing diagram and sequence of operation plot shown in FIG. 9*a*. The sequences A through E range from the production of the original generator or driver pulses to the final data output and the various wave forms in between.

The circuitry shown in FIG. 13 is designed to enhance the reliability for detecting the presence or absence of a data bit in the various data positions. Since the card readers may be called upon to operate over a wide range of manufacturing factor it is important to minimize the undesirable variations that may possibly result from the above mentioned conditions.

The essential portions of the circuitry will again include an oscillator 30 interconnected with an amplifier 31 for pulsing or strobing the primary coils 32 of sensors. Each one of the secondary coils 33 interconnect with a respective level detector circuit which includes a current amplifier 34 and a Schmitt trigger circuit 35. The output from the Schmitt trigger 35 is delivered to a monostable 36 which serves as an integrator with the data output therefrom being indicative of the presence or absence of a copper bit in the corresponding data positions. The oscillator or pulse generator identified above by the numeral 30 may take the form of a conventional monostable multivibrator which has a variable time constant in order to produce repetition rate variance. The repetition rate will be selected in order to strobe or pulse the primary coils 32 at a much higher rate than an individual could possibly extract the card from a card reader. This repetition rate further minimizes error due to the positioning of the card. The amplifier 31 is a conventional integrated circuit current amplifier which provides the necessary current drive for the primary coils 32 which are connected in parallel. It has been found that the narrower the pulse width, the larger the bit to no bit ratio may be obtained. Further, it has been noted that as the frequency or pulse rate increases, the dissipation in the copper material placed between the primary and secondary is increased proportionally and the bit to no bit ratio is also increased.

As suggested above, the primary and secondary coils are utilized with a ferrite cup core or shell core and with the secondary having approximately 6 times the number of turns thereon as the primary. As a result, a voltage increase is obtained from the primary to the secondary in order to compensate for losses which occur across the air gap.

As suggested above, the level detector circuitry output is integrated by a conventional integrator shown as a retriggerable monostable multivibrator. This device operates so that if pulses are continually coming in on the input, the output will remain in the retriggered mode. When the pulses on the input stop, the time constant of the monostable permits the device to time out so that the output falls indicating that a bit was placed between the primary and secondary coils.

The clock pulse which is used for strobing the information off of a card and into the storage register is derived by ORing together the outputs of all the data position columns. The ORing function is accomplished by using a NAND gate 37, operating with negative logic. Accordingly, if any one of the signals goes low to the input of the NAND gate 37, the output of same is then inverted and used as a stepping pulse. The purpose of this stepping (or clock) pulse is to load the data into shift registers or other storage devices. Sensing circuitry is used in conjunction with devices, such as the later described number comparator, and the clock pulse tells circuits that the numbers are ready to be read. It should be pointed out that separate and independent from this clock pulse is a pulse that drives the primary coils. Accordingly this type of circuit eliminates the need for a clock column on the card. However, primary coils receive continual pulses from an associated driver or oscillator.

As shown in FIG. 13a, the trigger pulses that arrive from the level detector Schmitt triggers 35 continuously keep the retriggerable monostable multivibrator 36 in the triggered mode. Therefore, the output of the monostables 36 stay high until the trigger pulses that are applied thereto fail to arrive. In this condition, the output of monostable falls to the low level. The important consideration in this particular design in that the time constant of the monostable multivibrator be at least greater than the minimum time between primary pulses. In actual practice, the time constant of the retriggerable monostable will usually be made 3 to 4 times longer than the period between pulses in the primary. This ensures that this system will perform reliably over a variation in temperature ranges as well as variations in component values.

Turning now to the decoding matrix shown in FIG. 10, it was mentioned above that the output from the push button keyboard panel would include a BCD representation of each number (on the four wires) that was being pushed. This 4 wire input connects with the matrix (FIG. 10) in the lower left hand portion thereof. It is important to note that the BCD input to the decoding matrix may come from a serial reader of the type just described as well as from the push button keyboard output. While the reader core block was shown as having 8 sensor positions, the following discussion will be referring to the utilization of only 4 of the sensor coil pairs and will therefore only sense 4 data columns on the card. Accordingly, as each data position row passes between the sensor coil pairs, a four wire out-put from the secondary coil and through whatever shaping circuitry is desired, will eventually deliver a 4 wire BCD input to the decoding matrix shown in FIG. 10. It should be understood that larger inputs along with more data positions may be utilized, if desired, and that the 4 bit binary coded number is used only for convenience of illustration. In any event, this number can range anywhere from zero through 14. Further, it should be pointed out that this particular device is utilizable with any type of binary coded inputs having 4 bits whether it is gray code, BCD code or any other randomly assigned code utilizing 4 bits to code the number.

The decoding or programming matrix will be comprised of 4 discreet sections with each section being able to program numbers ranging from zero to 14. These sections are shown in FIG. 10 and reading from right to left are the first digit section, the second digit section, the third digit section and the fourth digit section. In order to operate the system, a programmer will program in all the acceptable first digits in the first digit section. The same is true with the second, third and fourth digit sections. For example, if the desired number indicating a correct code is 6456, the first digit section will be programmed so that a jumper (or diode switch) is placed in the six position. Since the second digit to be accepted is a four, a jumper will be placed in the four position on the second digit section. In a similar manner, a 5 is jumpered in the third digit section and a 6 is connected in the last or the fourth digit section. If it is desirable to have an auxilliary or second number which is acceptable (for example the number 6856), the only digits which differ are in the second position thereby necessitating an additional jumper in the second digit section. Accordingly, a diode switch (or jumper) is interconnected into the number 8 position in the second digit section and the numbers 6456 and 6856 will both be accepted and indicated as correct by this matrix section.

The above mentioned concept of having one reader which may accept a plurality of numbers permits the device to program as many numbers (corresponding to individuals) as needed and to exclude all individuals not having cards with a data position corresponding (or knowing the correct push buttons) to said numbers. This method enables the programmer to absolutely fix all the combinations that will activate the card reader or push button lock. The additional circuits which will be discussed, infra, will include a correct digit counter and a total digit counter (along with the decoding matrix) to provide such functions as reset of the counters, delays to hold the door open for a preselected time period and circuitry to provide the necessary clock pulses and sequencing information.

As will be described, when a BCD input (corresponding to a four digit number) is entered, it is decoded instantaneously and fed to the 4 digit sections of the decoded matrix mentioned above. When the strobe pulse comes into the timing and comparison circuitry shown in FIGS. 11 and 12, a total digit counter (40) is advanced one position and the output of the first digit matrix is sampled. If a jumper (diode switch) has been inserted corresponding to the number that was entered, the number would be accepted and an output would appear on the first digit line (see the upper right hand portion of FIG. 10) which would cause the correct digit counter 41 to be advanced. It should be noted that if some other number other than a first digit 6 were entered, there would not be an output on the first digit line and correct digit counter 41 would not be advanced.

When the stepping line (FIG. 10) goes low for the second time it is an indication that the second digit has been entered and the total digit counter 40 advances to the second position and checks the output from the second digit section. In the above example, it was indicated that the numbers 4 and 8 were programmed into the second digit section. Therefore, if either a 4 or an 8 were entered into the decoder section, an output would appear on the second digit line and the correct digit counter 41 would step to position two through the AND condition being met in AND gate **50*b*. Gate 60*b* acts as an OR gate to step the correct digit counter 41 via line 60**.

After all 4 digits have been entered and the total digit counter 40 reaches the fourth position, the correct digit counter 41 is then sampled to ascertain whether or not its output is at the fourth position. If the output of correct digit counter 41 is not at 4 when the total digit counter 40 reaches 4, this indicates that one of the digits entered was not correct and a "no authorization" may be given.

The sampling of the correct digit counter is done in part by AND gate 42 which is a summing circuit. If the correct digit counter 41 is at 4 and the total digit counter is at 4, all inputs to AND gate 42 will be high and a low level output will be delivered therefrom. This low level output will set output latch 43 and an "authorization condition" will be gated out of AND gate 44 by the "5 second delay" output from the one shot circuit generally indicated by the numeral 45. This one shot monostable produces a 5 second pulse for the gating purposes mentioned immediately above.

All circuits will be reset immediately after the total digit counter reaches 4 except for the output latch which actually operates to store the correct digit counter output. The resetting occurs when the output timer turns on and begins to time the output so as to prevent unauthorized personnel from trying to enter another code during the interval that the total digit counter and the correct digit counter are being held in a reset condition.

If the correct digit counter 41 did not reach 4 thereby precluding the AND gate 42 from having an output, the output latch 43 will not be set and the authorization line will be in a condition to prevent the door or other associated devices from being activated. While AND gate 44 in effect provides for a summation at the output of the one shot timer circuit 45 and the output latch 43, it should be pointed out that the latch 43 also receives an output from the one shot 5 second timer via line 46 for additional reliability so that noise cannot inadvertently cause a device to open the door or activate an associated device.

The interdigit timer is generally represented by the number 47 and is comprised of an integrated circuit one shot multivibrator having an approximate 2 second time constant. When the strobe line, indicated by the numeral 48, goes low indicating that the first digit has been entered into the circuit, the interdigit timer is activated. This initiates the generation of an initial reset and preclear pulse and the feeding of same to the circuit as shown so that all conditions are put in their initial state thereby eliminating any inadvertent noise affect on the various latches since they will be repositioned to the correct position. Therefore, the counters will always start at the zero condition. Also, the interdigit timer serves to time the depressions of the push buttons on the keyboard in the event that a push button reader or combination reader is being utilized. This is necessary so that if a person starts to enter a code and decides to walk away from the reader with only the first half of the code entered, the device will operate to cancel the operation and to reclear itself preparatory to the next user of the device.

The interdigit timer is triggered each time an individual pushes (with the associated strobe line going low) a button and will provide an approximately 2 second delay before the next button must be pushed. If the user takes longer than 2 seconds authorization will be cancelled and he will be required to begin the entire operation again. The combination of the output timer 45 and the interdigit timer 47 cause the device to operate in a mode capable of precluding an individual from utilizing a trial and error code cracking technique since it is difficult if not impossible to discern whether or not the device is ready to have another code entered.

A special input shown in the upper left hand corner of FIG. 11 is utilized in the event that the push button lock is used in conjunction with a serial card reader input. If a card reader and a push button lock are utilized simultaneously, the input mentioned immediately above is jumper connected to the output of the preceeding circuit so that the card reader output has to be energized before the push button lock will be activated. This means that a user must insert the card and get the correct output from the card reader before he can properly operate the push button lock. The mechanism by which this is accomplished is the condition input summer described above as AND gate 42. This gate must have an input which is derived either by jumpering that condition to ground or by having another card reader mechanism activated prior to the operation of the push button lock.

The stepping input to the 4 digit number comparor comes from the clock which is derived from the four columns of data by ORing together the outputs of the 4 sensor coil circuits. In the event that a push button input is used, a special stepping contact is provided on keyboard. This special contact goes low each time that a push button is pushed in order to form the clock that is needed for the associated circuits.

As may be seen from FIGS. 11 and 12, the stepping line 48 is applied to the total digit counter and provides the means for totalizing the digits from either the serial reader or from the push button circuitry as they are entered. The outputs then from the counting circuits in the total digit counter are directed to the AND gates labeled 1, 2, 3 and 4. These AND gates are then interconnected to the sequence gates 50 (50a through 50d) shown in FIG. 11) which also have inputs thereto from the decoding matrix shown in FIG. 10. For example, if the stepping line 48 indicates that the first number is being entered into the device, the first counter of the total digit counter will be such that the AND gate 4 will have an output therefrom. This gate (4) is delivered to the input of AND gate 50*a* which also ANDS with the correct first digit line. If both inputs are present to gate 50*a*, the output therefrom will be delivered to the correct digit counter through the OR effect of gate 60a via line 60 for storage purposes. The second and third digits operate in the same fashion in conjunction with the stepping input. As can be seen, if the fourth digit is entered and the output from the AND gate numbered 4 is high but the fourth digit line is low because of an incorrect fourth digit, then the correct digit counter will not receive an indication that the fourth correct digit has been entered. The selective wiring of the total digit counter and the associated AND gates 1–4 will permit the skipping of rows when used with serial card readers described above. Accordingly data may be placed only on selective rows.

The condition summer (AND gate 42) is interconnected with the output from the correct digit counter 41 through AND gate 51. Also, the line 52 interconnects with the input of condit summer gate 42. This line (52) will have an indication thereon as to whether 4 digits have been counted in the total digit counter (see both FIGS. 11 and 12). If 4 total digits have been entered, and if the appropriate input is received from the other card or serial reader via line 61 then the correct digit counter must have an appropriate output therefrom via gate 51 in order to initiate the output latch 43 authorization condition. Obviously, if 4 correct digits have not been counted in the same period that 4 total digits have been entered, condition summer gate 42 will not be in a condition to permit the setting of output latch 43.

In summary, when the stepping pulse comes in (from either the card reader or keyboard) or the interdigit timer is activated, the circuits have a reset preclear pulse which initializes all counters, the output latch, and advances the digit counter to the one position. This enables the output of the first digit matrix, and if correct, the correct digit counter is advanced. This process proceeds until the button (or fourth card row) for the fourth digit is pushed. When the fourth digit is reached, a sample is taken of the correct digit counter (via the condition summer) to see if its output totals four, and authorization will be indicated when appropriate.

From the foregoing, it will be seen that this invention is one well adapted to attain all the ends and objects herein set fourth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of operating authorization control systems utilizing cards substantially the size of credit cards, said cards having hidden coded indicia thereon that is not discernible by sight or touch, said coded indicia being in the form of non-ferrous bits arranged in at least one row and encased therein, said method including the steps of manually causing relative motion between a row of sensors and a card having said hidden coded indicia thereon;

serially detecting the presence (or absence) of said bits in said row independently of the speed of said relative motion and without mechanically penetrating said card, said detection step including the steps of producing a clock pulse corresponding to the presence of at least one of said bits and using said clock pulse to sequentially read said data and deliver same to related circuits;

producing an electrical output having data therein that corresponds to said presence (or absence) of said bits in said card row; and determining the correctness of said code represented by said electrical output by decoding said data in a decoding matrix, said decoded data corresponding to a correct digit detected by said serially detecting step.

2. The method of claim 1 wherein said determining step includes the steps of counting the total number of digits produced by said producing step;

counting the number of digits that were decoded and indicated as being correct by said decoding step;

comparing the total number of digits produced by said producing step with the total number of correct digits, and producing an output indicating the correctness of said code when said total number of digits correlates with said total number of correct digits.

3. The method as in claim 2 including the step of skipping preselected rows with said bits therein.

4. A method of verifying the correctness of binary coded data, said method comprising the steps of transmitting said data to a decoding matrix, decoding said data corresponding to the correctness of at least one decimal digit of said binary coded data by comparing said decimal digit with a preselected correct number, counting the total number of said decimal digits in said binary coded data, counting the number of decimal digits that were decoded and indicated as being correct by said decoding step, comparing the total number of decimal digits with a total number of correct decimal digits, and producing an output indicating the correctness of said code when said total number of decimal digits correlates with said total number of correct decimal digits in a preselected manner.

5. In an apparatus for operating authorization control systems which utilize a card having hidden non-ferrous coded indicia thereon, the improvement comprising a plurality of sensors generally arranged in a row, each sensor having at least one primary coil and one secondary coil in spaced apart relationship, the coils being arranged to permit relative motion of said card between said primary and secondary coils;

means for energizing said primary coils at a preselected rate, said preselected energizing rate exceeding the rate at which said card may be manually moved with respect to said sensors;

said secondary coils having a first voltage level when said energizing means energizes said primary coil without coded indicia located between said primary and said secondary coils, and said secondary coils having a second voltage level when said energizing means energizes said primary coil with coded indicia located between said primary and said secondary coils; and means for serially correlating said second voltage level on said secondary coil with said hidden indicia on said card as said card moves relative to said coils.

6. The improvement as in claim 5 wherein said sensors are staggered with respect to each other in said rows, said staggering of said sensors thereby permitting only similarly staggered rows of said coded indicia to be detected by said sensors as said card moves relative to said sensors.

7. The combination as in claim 5 wherein said correlating means produces an electrical output signal having data therein that corresponds to said presence (or absence) of said indicia in said card, and digital means for producing an electrical output signal having data therein that is similar to said data detected from said card movement, said second electrical signal being interconnected with said correlating means, said correlating means having further means for verifying the correctness of said data in both of said electrical signals.

8. The combination as in claim 7 including means for requiring that one of said electrical signals occurs prior to the other of said electric signals before said verifying means may verify the correctness of said data.

9. A combination as in claim 8 including a means for producing a stepping pulse corresponding to the presence of at least one of said bits being located in a plurality of rows on said card.

10. The combination as in claim 9 including means for utilizing said stepping pulse to initiate the stepping of data in said correlating means.

11. An apparatus for operating authorization control circuits, said apparatus comprising a plurality of push button switches which are capable of being correlated to a preselected code, each of said push buttons corresponding to a digit, means for verifying the correctness of said digits by comparing them with predetermined correct digits each time one of said push button switches is activated, said determining means comprising a diode matrix;

means for counting the total number of digits in a preselected code;

means for counting the total number of correct digits; and means for producing an output indicating the correctness of said code which is comprised of a plurality of said digits when said total number of said digits correlates with said total number of correct digits in a preselected manner.

12. The combination as in claim 11, including means for electrically verifying the hidden coded indicia on a card, said hidden coded indicia being in the form of non-ferrous bits arranged in a plurality of rows encased therein.

13. An apparatus for operating authorization control circuits, said apparatus comprising a plurality of push button switches which are capable of being correlated to a preselected code, each of said push buttons corresponding to a digit, said apparatus comprising means for verifying the correctness of a digit each time a push button switch is activated, means for counting the total number of digits in a preselected code, means for counting the total number of correct digits, means for producing an output indicating the correctness of said code which is comprised of a plurality of said digits when said total number of said digits correlates to said total number of correct digits in a preselected manner, means for electrically verifying hidden coded indicia on a card, said hidden coded indicia being in the form of non-ferrous bits arranged in a plurality of rows and encased within said card, and means for skipping preselected rows in said card to verify only indicia in said rows not skipped by said skipping means.

* * * * *